US012767548B2

(12) United States Patent
Mori et al.

(10) Patent No.: US 12,767,548 B2
(45) Date of Patent: Oct. 20, 2026

(54) METHOD FOR PRODUCING LITHIUM HYDROXIDE

(71) Applicant: IDEMITSU KOSAN CO., LTD., Chiyoda-ku (JP)

(72) Inventors: Daisuke Mori, Chiba (JP); Masashi Machida, Hoai Nhon (VN); Futoshi Utsuno, Ichihara (JP); Tsuyoshi Hoshino, Chiba (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 632 days.

(21) Appl. No.: 18/251,338

(22) PCT Filed: Nov. 5, 2021

(86) PCT No.: PCT/JP2021/040755
§ 371 (c)(1),
(2) Date: May 1, 2023

(87) PCT Pub. No.: WO2022/097715
PCT Pub. Date: May 12, 2022

(65) Prior Publication Data

US 2023/0406718 A1 Dec. 21, 2023

(30) Foreign Application Priority Data

Nov. 6, 2020 (JP) ................................ 2020-186094
Nov. 4, 2021 (JP) ................................ 2021-180294

(51) Int. Cl.
*C01D 15/02* (2006.01)
*B01D 9/00* (2006.01)
(Continued)

(52) U.S. Cl.
CPC ........... *C01D 15/02* (2013.01); *B01D 9/0004* (2013.01); *B01D 9/0022* (2013.01); *C22B 3/22* (2013.01);
(Continued)

(58) Field of Classification Search
None
See application file for complete search history.

(56) References Cited

U.S. PATENT DOCUMENTS 4,636,295 A * 1/1987 Ball ....................... C01D 15/00
204/529
2018/0244531 A1 8/2018 Magnan et al.

FOREIGN PATENT DOCUMENTS

CN 109650414 A * 4/2019 ............. C01D 15/08
CN 110002476 A * 7/2019 ........... B01D 61/029
(Continued)

OTHER PUBLICATIONS

English translation of WO-2013153692-A1 (Year: 2013).*
(Continued)

*Primary Examiner* — Anthony J Zimmer
*Assistant Examiner* — Zachary John Baum
(74) *Attorney, Agent, or Firm* — Oblon, McClelland, Maier & Neustadt, L.L.P.

(57) ABSTRACT

Provided is a lithium hydroxide production method for producing high-purity lithium hydroxide efficiently and at a lower energy, wherein Li ions alone are recovered in a recovery liquid from a lithium ion extract extracted from a processed member of a lithium secondary battery, using a Li permselective membrane, and lithium hydroxide is produced from the recovery liquid.

7 Claims, 1 Drawing Sheet

(51) Int. Cl.
*C22B 3/22* (2006.01)
*C22B 26/12* (2006.01)
*H01M 10/54* (2006.01)

(52) U.S. Cl.
CPC ............ *C22B 26/12* (2013.01); *H01M 10/54* (2013.01); *C01P 2006/40* (2013.01)

(56) References Cited

FOREIGN PATENT DOCUMENTS

| | | | | | |
|---|---|---|---|---|---|
| JP | 2005-197149 | A | | 7/2005 | |
| JP | 2009-270188 | A | | 11/2009 | |
| JP | 2011-32151 | A | | 2/2011 | |
| JP | 2012-200666 | A | | 10/2012 | |
| JP | 2018-528150 | A | | 9/2018 | |
| JP | 2019-81953 | A | | 5/2019 | |
| WO | WO-2013153692 | A1 | * | 10/2013 | ............ C01D 15/02 |
| WO | WO 2020/171009 | A1 | | 8/2020 | |

OTHER PUBLICATIONS

English translation of CN-109650414-A Description. (Year: 2019).*
English translation of JP-2019081953-A Description. (Year: 2019).*
A.H. Lundberg Systems Limited. Evaporators & Crystallizers, 2024. Accessed electronically at https://www.ahlundberg.com/products/evaporator-crystallizer/ on Jan. 23, 2026. (Year: 2024).*
English translation of CN-110002476-A Description. (Year: 2019).*
Japanese Office Action issued Aug. 5, 2025 in Japanese Patent Application No. 2021-180294 (with English translation), 5 pages.
International Search Report and Written Opinion issued Jan. 11, 2022 in PCT/JP2021/040755 (with English Translation), 12 pages.

* cited by examiner

METHOD FOR PRODUCING LITHIUM HYDROXIDE

CROSS REFERENCE TO RELATED APPLICATIONS

This application is a National Stage entry under 35 U.S.C. § 371 of PCT/JP2021/040755, filed on Nov. 5, 2021, and claims priority to Japanese Patent Application No. 2020-186094, filed on Nov. 6, 2020, and Japanese Patent Application No. 2020-180294, filed on Nov. 4, 2021, the entire contents of which are incorporated herein by reference.

TECHNICAL FIELD

The present invention relates to a method for producing lithium hydroxide.

BACKGROUND ART

With a rapid spread of information-related devices and communication devices such as personal computers, video cameras, and mobile phones in recent years, development of batteries used as power sources for these devices has been regarded as important. In the related art, an electrolytic solution containing a combustible organic solvent has been used for a battery used for such an application, but a battery in which the electrolytic solution is replaced with a solid electrolyte layer has been developed since, by making the battery into an all-solid state, the combustible organic solvent is not used in the battery, a safety device can be simplified, and a production cost and productivity are excellent.

Lithium secondary batteries and the like are used as batteries for use in the applications described above, and in recent years, use for hybrid cars and electric vehicles that are developed to cope with carbon dioxide gas emission regulations has also been studied. Therefore, there has been an urgent need to secure a lithium source more than ever, and as a part thereof, a technique for recovering lithium by recycling a lithium secondary battery has been developed (for example, see PTL 1).

As a solid electrolyte for use in lithium secondary batteries and others, known is a sulfide solid electrolyte. A sulfide solid electrolyte has a high ionic conductivity, and is therefore useful for high-power batteries. For producing a sulfide solid electrolyte, lithium sulfide is used widely as a raw material, and a demand for lithium hydroxide to be a raw material for lithium sulfide is increasing. As a lithium hydroxide production method, there exists a method of electrolyzing an aqueous solution or a suspension of lithium carbonate via an ion-exchange membrane to produce an aqueous solution of lithium hydroxide (for example, see PTL 2).

CITATION LIST

Patent Literature

PTL 1: JP 2019-81953 A
PTL 2: JP 2009-270188 A

SUMMARY OF INVENTION

Technical Problem

The technique described in PTL 1 is for recovering lithium ions from a lithium ions-containing raw liquid using a lithium ion conductor, but with an increase in demand for lithium, improvement in lithium recovery efficiency has become required more than ever. In the technique described in PTL 2, the raw material for lithium hydroxide is limited to lithium carbonate, and further improvement is necessary for obtaining lithium hydroxide using any other lithium-containing aqueous solution as a raw material. The process of obtaining lithium hydroxide according to the technique described in PTL 2 requires a water removal step of heating concentration or the like and therefore requires much energy consumption. Accordingly, for obtaining lithium more inexpensively, reduction of energy to be required is necessary.

The present invention has been made in view of such circumstances, and an object of the present invention is to provide a lithium hydroxide production method and a lithium hydroxide production apparatus capable of efficiently producing high-purity lithium hydroxide at lower energy.

Solution to Problem

As a result of intensive studies to solve the above problem, the present inventors have found that the above problem can be solved by the following invention.

1. A method for producing lithium hydroxide, including recovering Li ions alone in a recovery liquid from a lithium ion extract extracted from a processed member of a lithium secondary battery, using a Li permselective membrane, and producing lithium hydroxide from the recovery liquid, in which:

the Li ions are recovered while the temperature of the recovery liquid is controlled at 50° C. or higher, and lithium hydroxide is separated from the recovery liquid.

2. The lithium hydroxide production method according to the above 1, in which the temperature is 80° C. or higher and 100° C. or lower.
3. The lithium hydroxide production method according to the above 1 or 2, in which the separation is by crystallization.
4. The lithium hydroxide production method according to the above 3, in which the crystallization is cooling crystallization.
5. The lithium hydroxide production method according to the above 4, in which the cooling crystallization is performed with maintaining a positive pressure by blowing an inert gas into the recovery liquid for the crystallization.
6. The lithium hydroxide production method according to the above 4 or 5, in which the cooling crystallization is performed while the temperature of the recovery liquid for the crystallization is controlled at 40° C. or lower.
7. The lithium hydroxide production method according to the above 3, in which the crystallization is evaporative crystallization.
8. The lithium hydroxide production method according to the above 7, including adding pure water formed in the evaporative crystallization to filtrate or the recovery liquid.
9. The lithium hydroxide production method according to any one of the above 3 to 8, including adding the filtrate formed in the crystallization to the recovery liquid.
10. The lithium hydroxide production method according to the above 9, in which the filtrate is heated.
11. The lithium hydroxide production method according to the above 10, in which the exhaust heat or the surplus heat in the crystallization is used for the heating.

12. The lithium hydroxide production method according to any one of the above 9 to 11, in which impurities are not removed in adding the filtrate to the recovery liquid.
13. The lithium hydroxide production method according to any one of the above 1 to 12, in which the Li permselective membrane contains a Li-containing oxide or oxynitride.
14. A lithium hydroxide production apparatus equipped with:
a Li ion recovering tank equipped with a Li permselective membrane for recovering Li ions alone from a lithium ion extract extracted from a processed member of a lithium secondary battery,
a recovery liquid storage tank for storing the recovery liquid for recovering the Li ions,
a temperature controlling device of controlling the recovery liquid at 50° C. or higher, and
a separation device for separating lithium hydroxide from the recovery liquid.
15. The lithium hydroxide production apparatus according to the above 14, in which the separation device is a crystallization device.
16. The lithium hydroxide production apparatus according to the above 15, in which the filtrate formed in the crystallization device is added to the recovery liquid.

Advantageous Effects of Invention

According to the present invention, it is possible to provide a lithium hydroxide production method and a lithium hydroxide production apparatus capable of efficiently producing high-purity lithium hydroxide at lower energy.

DESCRIPTION OF EMBODIMENTS

Figure 1:
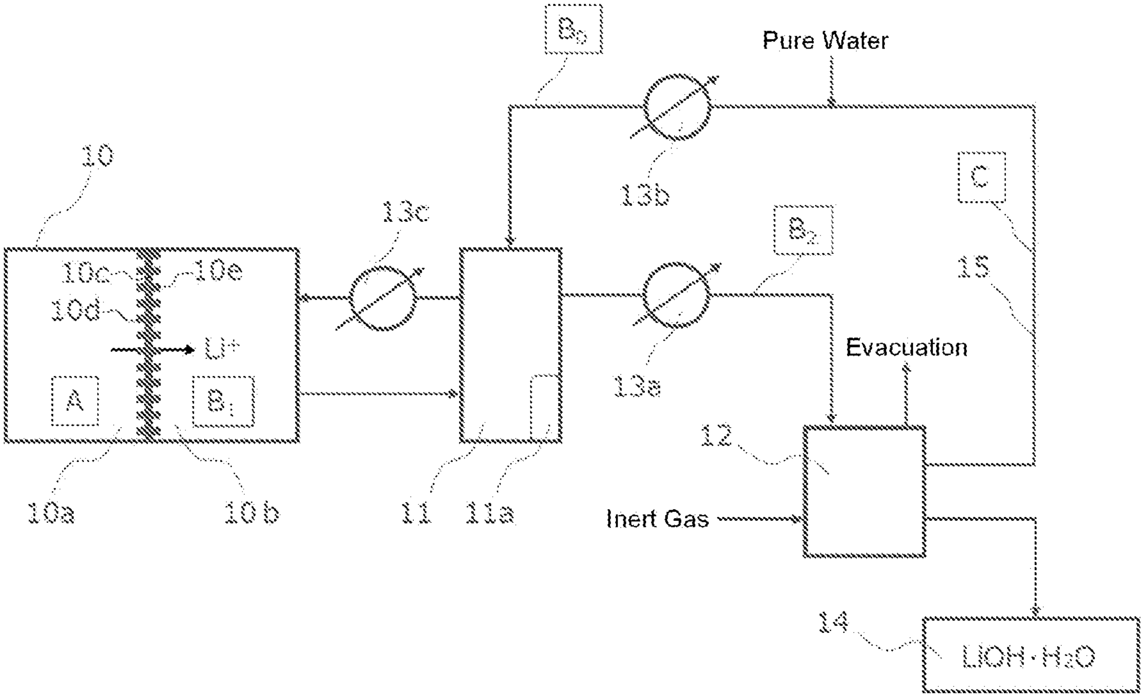
FIG. 1 is a flowchart showing one embodiment of a lithium hydroxide production apparatus capable of performing a lithium hydroxide production method of the present embodiment.

Hereinafter, a lithium hydroxide production method and a lithium hydroxide production apparatus of one embodiment of the present invention (hereinafter referred to as "the present embodiment") will be described below. The lithium hydroxide production method and the lithium hydroxide production apparatus of one embodiment of the present invention are merely one embodiment for the lithium hydroxide production method and the lithium hydroxide production apparatus of the present invention, and the present invention is not limited to the lithium hydroxide production method and the lithium hydroxide production apparatus of one embodiment of the present invention. In the present description, lithium means both lithium and lithium ions, and should be interpreted as appropriate as long as technical contradiction does not occur.

[Lithium Hydroxide Production Method]

The lithium hydroxide production method of the present embodiment is a method for producing lithium hydroxide, which includes recovering Li ions alone in a recovery liquid from a raw liquid containing an aqueous Li ion solution, particularly a lithium ion extract extracted from a processed member of a lithium secondary battery, using a Li permselective membrane, and producing lithium hydroxide from the recovery liquid, and in which the Li ions are recovered while the temperature of the recovery liquid is controlled at 50° C. or higher, and lithium hydroxide is separated from the recovery liquid. In the production method of the present embodiment, by controlling the recovery liquid under a specific temperature condition of 50° C. or higher, the Li ion solubility in the recovery liquid can be increased and a large amount of Li ions can be thereby recovered. In addition, by crystallization of the heated recovery liquid, lithium hydroxide can be produced with suppressing energy consumption. Further, by employing a Li permselective membrane, the production method is applicable to a broad range of a raw liquid that contains an aqueous Li ion solution, with no need for selection of the kind of raw liquid and with no specific limitation, but in the present embodiment, a lithium ion extract extracted from a processed member of a lithium secondary battery is employed. Consequently, according to the production method of the present embodiment, high-purity lithium hydroxide can be obtained efficiently at a lower energy.

[Recovery of Li Ions Alone in Recovery Liquid]

In the lithium hydroxide production method of the present embodiment, Li ions alone are recovered in a recovery liquid from a lithium ion extract extracted from a processed member of a lithium secondary battery which is to be a raw liquid containing an aqueous Li solution (the extract may be simply referred to as "raw liquid"), using a Li permselective membrane. Here, "Li ions alone" means substantially containing no other ions than Li ions, and means that the content of the other ions is 0.5% by mass or less.

(Raw Liquid)

As the raw liquid containing an aqueous Li ion solution, any one containing Li ions is employable with no specific limitation, and examples thereof include concentrated water prepared by concentrating seawater, salt lake brine, mineral wastewater, geothermal water or a combination of some of these, by means such as evaporation.

The raw liquid also includes the above-mentioned raw liquid, that is, a Li ion extract extracted from a processed member of a lithium secondary battery. With no specific limitation, the Li ion extract may be any one extracted from processed members, and examples thereof include one extracted from a processed member of a lithium secondary battery containing a sulfide solid electrolyte, that is, a Li ion extract containing a sulfide solid electrolyte. In the present embodiment, one alone or plural kinds of the above-mentioned seawater and others and the Li ion extract can be used either singly or as combined.

In the present embodiment, the sulfide solid electrolyte means a solid electrolyte at least containing a lithium element and a sulfur element, and examples thereof include those containing a lithium element, a sulfur element and a phosphorus element typically such as $Li_2S—P_2S_5$, as well as those further containing a halogen atom, such as $Li_2S—P_2S_5—LiI$, $Li_2S—P_2S_5—LiCl$, $Li_2S—P_2S_5—LiBr$, $Li_2S—P_2S_5—LiI—LiBr$, $Li_2S—P_2S_5—Li_2O—LiI$, and $Li_2S—SiS_2—P_2S_5—LiI$.

As the Li ion extract, a typical example of the Li ion extract extracted from a processed member of a lithium secondary battery containing a sulfide solid electrolyte is an aqueous solution of a sulfide solid electrolyte obtained by dissolving a sulfide solid electrolyte used in a lithium secondary battery, with an aqueous alkaline solution.

Preferred examples of the alkali component of the aqueous alkaline solution for dissolving the sulfide solid electrolyte include sodium hydroxide, lithium hydroxide, potassium hydroxide, rubidium hydroxide, cerium hydroxide, tetramethylammonium hydroxide, tetraethylammonium hydroxide, calcium hydroxide, barium hydroxide, europium (II) hydroxide, thallium(I) hydroxide, and guanidine. One kind alone or two or more kinds of these alkali components can be used either singly or as combined. From the viewpoint of easy dissolvability of sulfide solid electrolytes, sodium hydroxide, potassium hydroxide and calcium hydroxide are more preferred as the alkali component.

The Li ion extract usable as a raw liquid can be prepared using a generally-known ordinary electrodialysis apparatus. In an electrodialysis apparatus, monovalent cations such as a Li ion ($Li^+$), and a Na ion ($Na^+$) can pass through a cation exchange membrane to move toward a cathode (processed liquid), and the other polyvalent cations hardly pass through a cation exchange membrane and anions do not pass through a cation exchange membrane. Consequently, the Li ion ($Li^+$) to be recovered moves from the raw material liquid to the processed liquid. On the other hand, in the cathode, OH ions formed through electrolysis of water. Accordingly, using an electrodialysis apparatus, Li ions in a raw material liquid can be moved toward a processed liquid and at the same time the processed liquid can be made alkaline. However, in the electrodialysis treatment, other monovalent cations such as Na ion ($Na^+$) (non-Li monovalent cation) simultaneously move into the processed liquid along with Li ions. Consequently, using the processed liquid after electrodialysis treatment as a raw liquid, Li ions can be selectively recovered in the recovery liquid.

Specifically, in the case where the Li ion extract is non-alkaline, an alkaline aqueous solution (processed liquid) containing Li ions is formed using an ordinarily-known general electrodialysis apparatus, and this is used as a raw liquid to efficiently obtain Li (Li ions) in the recovery liquid.

(Recovery Liquid)

With no specific limitation, the recovery liquid used in the present embodiment may be any one capable of dissolving Li ions, and can be appropriately selected depending on the form the lithium to be finally obtained. For example, pure water such as distilled water or ion-exchanged water is preferably used as the recovery liquid.

In the production method of the present embodiment, the recovery liquid is supplied as water such as pure water or ion-exchanged water, and Li ions are moved thereinto from a raw liquid to be a recovery liquid containing Li ions (hereinafter this may be simply referred to as "Li ion-containing recovery liquid"). Then, lithium hydroxide is crystallized out from the Li ion-containing recovery liquid, and the liquid is then a recovery liquid substantially not containing Li ions. The recovery liquid not substantially containing Li ions thus remaining after crystallization can be referred to as a filtrate. The filtrate is one having remained after removal of Li ions from the Li ion-containing recovery liquid by crystallization, and can also be said to be a recovery liquid not substantially containing Li ions.

(Temperature Control for Recovery Liquid)

The present embodiment where Li ions alone are recovered from a raw liquid to a recovery liquid requires temperature control for the recovery liquid at or higher. When the temperature of the recovery liquid is lower than 50° C., efficient recovery of Li ions into the recovery liquid is impossible, and in addition, lithium hydroxide crystallization efficiency from the recovery liquid also lowers.

By recovering Li ions under temperature control for the recovery liquid at or higher, Li ions can be recovered efficiently, that is, under temperature control at 50° C. or higher, the solubility of lithium ions in the recovery liquid increases and lithium ions are supplied from the raw liquid by an amount corresponding to the increased solubility of lithium ions, so that a large amount of lithium ions can be recovered. In addition, by crystallizing the heated recovery liquid, lithium hydroxide can be produced with suppressing energy consumption.

In the present embodiment, the recovery liquid temperature to be controlled in recovery of Li ions is preferably 60° C. or higher, more preferably 70° C. or higher, even more preferably 80° C. or higher, and the upper limit is preferably 100° C. or lower, more preferably 95° C. or lower, even more preferably 90° C. or lower. The temperature of the recovery liquid in the present description means a preset value of the temperature to be controlled, and since the temperature of the actual recovery liquid may fluctuate up and down around the center of the preset value, the temperature of the actual recovery liquid can include the preset range±less than 2.0° C. The same shall apply to the temperature of the raw liquid to be mentioned below.

In the present embodiment, the raw liquid can be under pH control. By pH control, Li can be recovered efficiently. In that case, the pH is controlled preferably within a range of 12 or more and 14 or less. The pH range of 12 or more and 14 or less is a control target, and regarding the pH range of 12 or more and 14 or less of the raw liquid in the present embodiment, pH 12 can cover a value of 11.5 or more and less than 12.5, and pH 14 can cover a value of 13.5 or more and less than 14.5, that is, in fact, the pH range means a range of 11.5 or more and less than 14.5.

In the present embodiment where the pH of the raw liquid is controlled, the means is not specifically limited. For example, an aqueous alkaline solution can be added to the raw liquid for pH control. Also pH control for the raw liquid can be carried out in recovering Li ions in the recovery liquid, that is, Li ions can be recovered under pH control for the raw liquid, or pH control for the raw liquid can be previously carried out before recovering Li ions in the recovery liquid.

Preferred examples of the alkali component in the aqueous alkaline solution for use in pH control for the raw liquid include sodium hydroxide, lithium hydroxide, potassium hydroxide, rubidium hydroxide, cesium hydroxide, tetramethylammonium hydroxide, tetraethylammonium hydroxide, calcium hydroxide, barium hydroxide, europium(II) hydroxide, thallium(I) hydroxide, and guanidine. One kind alone or two or more kinds of these alkali components can be used either singly or as combined. Among these, from the viewpoint of rapid pH control for the lithium ion extract, sodium hydroxide is more preferred.

Like the recovery liquid, the raw liquid may also undergo temperature control, concretely, can be heated. With that, the temperature of the recovery liquid can be readily controlled at 50° C. or higher, and Li ions can be thereby recovered with high efficiency. In the case of raw liquid temperature control, the controlled temperature may fall within the range of temperature control for the recovery liquid mentioned above.

(Li Permselective Membrane)

The Li permselective membrane is a membrane having a function of moving Li ions in a raw liquid into a recovery liquid, and is generally arranged so as to partition a raw liquid and a recovery liquid.

The Li permselective membrane is preferably composed of a Li permselective membrane body formed of a super Li ion conductor (ion conductor) having an especially high ionic conductivity and a Li adsorbent layer formed on the raw liquid side thereof as a thin layer.

When a super Li ion conductor is used for the Li permselective membrane body, Li recovery efficiency can be improved by increasing an ion current of Li ions flowing between electrodes. Here, Li ions contained in an aqueous solution are present as Li hydrated ions in which water molecules are coordinated around Li ions. Therefore, in order to further increase the ion current, it is effective to implement a situation in which water molecules are easily removed from a surface of the Li permselective membrane (interface between the Li permselective membrane and a raw liquid).

Therefore, a Li adsorption layer that adsorbs Li ions (excluding hydrates) in a Li ion extract is preferably formed on the surface of the Li permselective membrane. That is, the Li permselective membrane is preferably subjected to a surface Li adsorption treatment. As described later, the Li adsorption layer is preferably formed by modifying a surface of a material constituting the Li permselective membrane.

Preferred examples of a material constituting the Li permselective membrane body include an oxide and oxynitride containing Li as described below. That is, the Li permselective membrane preferably contains the following oxides and oxynitrides containing Li.

Examples of the oxide containing Li include lithium lanthanum titanate: $(Li_x,La_y)TiO_z$ (here, x=3a−2b, y=2/3−a, z=3−b, 0<a≤1/6, 0≤b≤0.06, x>0) (hereinafter also referred to as "LLTO"), lithium lanthanum zirconate: $Li_7La_3Zr_2O_{12}$ (hereinafter also referred to as "LLZO"), lithium lanthanum niobate: $Li_5La_3Nb_2O_{12}$, and lithium lanthanum tantalate: $Li_5La_3Ta_2O_{12}$. More specifically, $Li_{0.29}La_{0.57}TiO_3$ (a≈0.1, b≈0) can be used as LLTO.

These materials can be obtained, for example, as a sintered body obtained by mixing particles formed of this material with a sintering aid or the like and sintering the mixture at a high temperature (1000° C. or higher). In this case, a surface of the Li permselective membrane can also be formed as a porous structure in which fine particles formed of LLTO are bonded (sintered), so that an effective area of a surface of the Li permselective membrane body can be increased. The same applies not only to LLTO but also to other oxides containing Li and oxynitrides containing Li described later.

Examples of the super Li ion conductor that can be used as the material constituting the Li permselective membrane body include, as the oxide containing Li, $Li_{1+x+y}Al_x(Ti,Ge)_{2-x}Si_yP_{3-y}O_{12}$ (here, 0≤x≤0.6, 0≤y≤0.6) ($Li_2O$—$Al_2O_3$—$SiO_2$—$P_2O_5$—$TiO_2$—$GeO_2$-based, hereinafter also referred to as "LASiPTiGeO"), which is a Li-substituted Na super ionic conductor (NASICON) crystal, in addition to the above LLTO, LLZO, and the like.

Preferable examples of the oxynitride containing Li include lithium oxynite phosphate ($Li_3PON$, hereinafter also referred to as "UPON"), a nitride of LLTO (LLTON), a nitride of LLZO (LLZON), and a nitride of LASiPTiGeO (LASiPTiGeON).

The super Li ion conductor such as an oxide or an oxynitride containing Li contains Li as one of constituent elements thereof, and Li ions outside the crystal migrate between Li sites in the crystal, thereby exhibiting ion conductivity. Li ions flow through the Li permselective membrane body, but sodium ions cannot flow through the Li permselective membrane. At this time, Li ions ($Li^+$) conduct in the crystal, and Li hydrate ions present in the raw liquid together with Li ions are not introduced to the Li sites, and thus do not conduct in the crystal. This point is the same as the Li permselective membrane described in WO 2015/020121.

Here, if only a large amount of Li ions are particularly adsorbed on the surface of the Li permselective membrane body by the Li adsorption layer, water molecules of the Li hydrated ions are removed during the adsorption, and since only Li ions are present, conduction efficiency of Li ions from a raw liquid side (one principal plane side) to a recovery liquid side (the other principal plane side) in the Li permselective membrane body (ion current flowing through the Li permselective membrane body) can be increased.

Preferably, an anode and a cathode bond to the Li permselective membrane, and preferably, an anode bonds to the raw liquid side (one principal plane) of the Li permselective membrane and a cathode bonds to the recovery liquid side (the other principal plane) thereof. Having the structure, one principal plane on the raw liquid side of the Li permselective membrane and the other principal plane on the recovery liquid side thereof are kept at a predetermined electropositive potential or electronegative potential, respectively.

As the materials for the anode and the cathode, metal materials not causing electrochemical reaction in the raw liquid and the recovery liquid can be appropriately used. Examples of the metal materials usable here include SUS, Ti and Ti—Ir alloy.

The above material usable as the Li permselective membrane is solid and is known to exhibit electroconductivity by the Li ion flow running through crystals like free electrons. Consequently, in the case where the anode has an electropositive potential and the cathode has an electronegative potential, those of Li ions (positive ions) in the raw material on the anode side having reached the cathode side of the Li permselective membrane run toward the cathode side (recovery liquid) from the anode side (raw material) of the Li permselective membrane by ionic conduction. The Li ions having reached the cathode side of the Li permselective membrane are recovered in the recovery liquid. Consequently, after a predetermined period of time, the Li ion concentration in the raw material lowers and the Li ion concentration in the recovery liquid increases.

A Li adsorbent layer is formed on the surface of the Li permselective membrane body as a thin film thereon, by chemical treatment of the Li permselective membrane body. Specifically, by acid treatment of one principal plane of the Li permselective membrane body (for example, LLTO), for example, by exposure of the plane to hydrochloric acid or nitric acid for 5 days, the layer is formed. It is presumed that, by the treatment, a substance layer (HLTO) having a composition of nearly $H_{0.29}La_{0.57}TiO_3$ can be formed, in which Li that is especially easily oxidizable among the constituent elements in the Li permselective membrane body (for example, LLTO), is substituted with hydrogen in an acid. Here, the formation of the thin layer (HLTO) on the surface is supported by the presence of a substance having a peak differing from that of the Li permselective membrane body (for example LLTO) from the results of X-ray diffractometry in WO2017/131051.

The H site in HLTO is a site that is naturally an Li site, and therefore H can be especially readily substitutable with a Li ion but can be hardly substituted with any other ion (for example sodium ion). Consequently, HLTO functions as a Li adsorbent layer. In addition, HLTO is formed only by reaction with an acid, and is therefore formed only on the outermost surface of the Li permselective membrane body.

[Separation of Lithium Hydroxide]

The lithium hydroxide production method in the present embodiment includes separation of lithium hydroxide from the recovery liquid as a method of producing lithium hydroxide from the recovery liquid. Specifically, in the production method of the present embodiment, after recovery of Li ions alone in the recovery liquid, lithium hydroxide is separated from the recovery liquid that contains Li ions (Li ion-containing recovery liquid) obtained by recovery of Li ions alone from the raw liquid. In that manner, lithium hydroxide can be obtained not requiring a dewatering step such as concentration under heat, and therefore, energy consumption for a dewatering step can be reduced and a lithium source can be obtained more efficiently.

With no specific limitation, the separation method can be any one capable of separating lithium hydroxide from the Li ion-containing recovery liquid, and a preferred example thereof is a method of crystallization such as cooling crystallization and evaporative crystallization.

(Cooling Crystallization)

In cooling crystallization, the recovery liquid is heated in the previous step of crystallization to increase the Li ion content in the recovery liquid, and by thus increasing the temperature difference, Li ions can be recovered more efficiently. In the case of cooling crystallization, the concrete method is not specifically limited so far as the method is ordinary cooling crystallization. For example, preferably, the cooling crystallization is performed with maintaining a positive pressure by blowing an inert gas into the Li ion-containing recovery liquid. By blowing an inert gas thereinto, formation of lithium carbonate (hereinafter this may be simply referred to as "carbonation") can be suppressed to promote more the formation of lithium hydroxide by cooling crystallization, and therefore high-purity lithium hydroxide can be produced more efficiently.

In the case where the recovery liquid is heated in the previous step of crystallization, the heating temperature is preferably 50° C. or higher, more preferably 60° C. or higher, and the upper limit is 80° C. or lower. When the heating temperature falls within the range, cooling crystallization can be performed more efficiently.

The level of the positive pressure is not specifically limited, and can be generally 0.1 to 30 kPa or so as the gauge pressure, and is, from the viewpoint of more efficiently performing cryocrystallization, preferably 0.5 to 10 kPa.

As the inert gas, a nitrogen gas or an argon gas can be used. For performing cooling crystallization under a positive pressure, the positive pressure can be performed by controlling charging and discharging of the inert gas. From the viewpoint of suppressing carbonation, employable here is an oxygen-containing gas having a concentration of carbon monoxide, carbon dioxide or carbon hydride of 10 ppm or less. For obtaining lithium hydroxide having a higher purity, the concentration is preferably 1 ppm or less, more preferably 0.1 ppm or less.

In the case of cooling crystallization, the temperature is preferably controlled at 40° C. or lower from the viewpoint of more efficiently performing cooling crystallization. From the same viewpoint, the crystallization temperature is preferably 35° C. or lower, more preferably 30° C. or lower, even more preferably or lower. The lower limit is not specifically limited, and can be higher than preferably 3° C. or higher.

In the production method of the present embodiment where cooling crystallization is employed as the crystallization, the Li ion-containing recovery liquid can be cooled, as needed. By cooling it, the temperature of the Li ion-containing recovery liquid can be positively controlled to fall within the above-mentioned preferred range, and therefore cooling crystallization can be performed more efficiently. Accordingly, from the viewpoint of more efficiently performing crystallization, preferably, the Li ion-containing recovery liquid is previously cooled and then crystallized.

As the method of cooling the Li ion-containing recovery liquid, employable is any of an air-cooling system or a water-cooling system, and a cooling device can be used depending on the cooling system employed.

(Evaporative Crystallization)

In evaporative crystallization, the recovery liquid is heated in the previous step of crystallization, and therefore the energy necessary for evaporation can be suppressed. In the case of evaporative crystallization, any ordinary evaporative crystallization method is employable with no specific limitation as the concrete method, and for example, the temperature is preferably controlled to be 80° C. or higher and 100° C. or lower. From the viewpoint of more efficiently performing evaporative crystallization, more preferably, the temperature is controlled to be 85° C. or higher, even more preferably 90° C. or higher.

From the viewpoint of more efficiently performing evaporative crystallization, preferably, the evaporative crystallization is performed in a reduced-pressure atmosphere. Under reduced pressure, the water vapor generated in the system can be discharged out, and for recovery, it can be added to the filtrate or the recovery liquid.

For depressurization, the pressure is not specifically limited. In general, the pressure can be 0.05 to 10 kPa or so as a vacuum pressure, and from the viewpoint of more efficiently performing evaporative crystallization, the pressure is preferably 0.1 to 5 kPa, more preferably 0.2 to 1 kPa.

Also the evaporative crystallization can be performed with supply of an inert gas. The inert gas in the case can be a nitrogen gas or an argon gas. From the viewpoint of suppressing carbonation, employable here is an oxygen-containing gas having a concentration of carbon monoxide, carbon dioxide or carbon hydride of 10 ppm or less. For obtaining lithium hydroxide having a higher purity, the concentration is preferably 1 ppm or less, more preferably 0.1 ppm or less.

[Addition of Filtrate to Recovery Liquid]

In the production method of the present embodiment, the filtrate formed in the crystallization can be added to the recovery liquid. Since lithium ions are recovered from the recovery liquid as lithium hydroxide anhydride or lithium hydroxide hydrate, the filtrate is added to replenish the recovery liquid with water. Adding the filtrate to the recovery liquid for reusing it provides a great advantage in that the lithium discharge in the filtrate and the discharge of the filtrate itself can be reduced. In addition, the amount of fresh pure water to be supplied for the recovery liquid can be reduced, and therefore lithium hydroxide can be more efficiently produced. The recovery liquid to which the filtrate is added is the recovery liquid that is used for moving Li ions from the raw liquid, and is not the Li ion-containing recovery liquid.

In the present embodiment, in addition, a heat exchanger can be arranged for being able to use the exhaust heat in cooling crystallization and the surplus heat generated in evaporative crystallization for heating the recovery liquid. With that, the thermal efficiency can be increased more.

As described above, in the case of evaporative crystallization, the pure water formed in evaporative crystallization can be readily reused by adding to the filtrate or the recovery liquid, and the amount to be used of fresh pure water can be reduced. Further, as compared with the case of additionally supplying fresh pure water, the filtrate having a higher temperature than the fresh pure water can be reused, and therefore lithium hydroxide can be produced more efficiently in point of thermal energy.

Also a filtrate is formed in the case of cooling crystallization. The filtrate is one having remained after crystallization of lithium hydroxide from the Li ion-containing recovery liquid, and therefore the filtrate can be said to be a recovery liquid from which Li ions have been removed, that is, a recovery liquid substantially not containing Li ions, but may contain, as the case may be, Li ions contained in the recovery liquid. Accordingly, in that case, the filtrate can be one that cannot be said to be pure water, but can be reused by adding to the recovery liquid. Therefore, in the case, the amount to be used of fresh pure water can be reused, and lithium hydroxide can be produced more efficiently. In that manner, in any case of employing cooling crystallization or evaporative crystallization as the crystallization, the filtrate formed in the crystallization can be reused by adding to the recovery liquid. In general, in the filtrate discharged as a filtrate in crystallization, impurities contained in the target liquid for crystallization remain as such. However, in the production method of the present embodiment, the recovery liquid to be a target subject for crystallization contains Li ions alone recovered via the Li permselective membrane. Consequently, the filtrate discharged by crystallization contains Li ions alone and does not contain any other impurity. Accordingly, reuse of the filtrate in the present embodiment can be achieved only in using the Li permselective membrane.

In the case where the filtrate is added to the recovery liquid, the filtrate can be heated, as needed. In the production method of the present embodiment, the temperature of the recovery liquid is controlled at 50° C. or higher, but by adding the heated filtrate to the recovery liquid, the temperature of the recovery liquid can be increased to accelerate movement of Li ions from the raw liquid to the recovery liquid. As a result, Li ions can be more readily recovered in the recovery liquid, and lithium hydroxide can be produced more efficiently. In the case where the filtrate is heated, preferably, the temperature thereof is so controlled that the temperature of the recovery liquid can be 50° C. or higher, and more preferably temperature and the like so controlled that the recovery liquid can be the above-mentioned preferred temperature. For heating the filtrate, the exhaust heat in cooling crystallization or the surplus heat generated in evaporative crystallization, which is a heat source usable in heating the recovery liquid, can be used.

In adding the filtrate to the recovery liquid, any other impurities than Li ions have been removed by the permselective membrane, though Li ions may be contained in the filtrate as described above, and therefore the filtrate can be reused even when it is not additionally processed for impurity removal.

Lithium hydroxide obtained by crystallization is generally monohydrate ($LiOH \cdot H_2O$). In the production method of the present embodiment, lithium hydroxide is separated from the filtrate by solid-liquid separation and the like, and the resultant lithium hydroxide can be directly used as it is in accordance with the use thereof, or can be used after further dewatered.

In the case where monohydrate of lithium hydroxide is dewatered, for example, it can be dried in any ordinary manner of heating or depressurization.

[Lithium Hydroxide Production Apparatus]

The lithium hydroxide production apparatus of the present embodiment is equipped with a Li ion recovery tank equipped with a Li permselective membrane for recovering Li ions alone from a lithium ion extract extracted from a processed member of a lithium secondary battery, a recovery liquid storage tank for storing the recovery liquid for recovering Li ions, a temperature controlling device of controlling the recovery liquid at 50° C. or higher, and a separation device for separating lithium hydroxide from the recovery liquid. Preferably, in the lithium hydroxide production apparatus of the present embodiment, the separation device is a crystallization device. Also preferably, the apparatus is equipped with a filtrate recovery device for adding the filtrate formed in the crystallization device to the recovery liquid.

The lithium hydroxide production method of the present embodiment mentioned above can be more readily performed using the lithium hydroxide production apparatus of the present embodiment.

Figure 2:
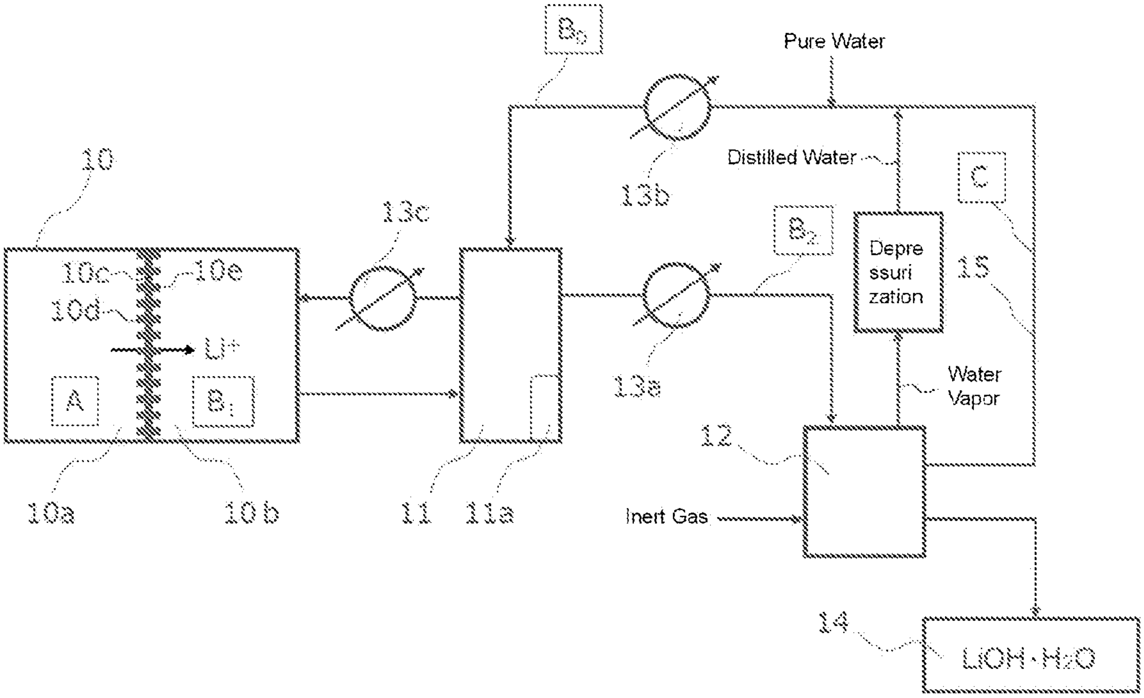
FIG. 2 is a flowchart showing one embodiment of a lithium hydroxide production apparatus capable of performing a lithium hydroxide production method of the present embodiment.

FIGS. 1 and 2 each are a flowchart showing one typical preferred embodiment of the lithium hydroxide production apparatus of the present embodiment capable of performing the lithium hydroxide production method of the present embodiment, in which a crystallization device is employed as a separation device for separating lithium hydroxide from the recovery liquid. FIG. 1 is a flowchart of the case of employing cooling crystallization as crystallization, and FIG. 2 is a flowchart of the case of employing evaporative crystallization. The lithium hydroxide production apparatus shown in FIGS. 1 and 2 is provided with a filtrate recovery device for adding the filtrate formed in the crystallization device to the recovery liquid.

The lithium hydroxide production apparatus shown in FIG. 1 has a Li ion recovery tank 10, a recovery liquid storage tank 11 for storing a recovery liquid, a crystallization device 12 for crystallizing the recovery liquid, which is a separation device for separating lithium hydroxide from the recovery liquid (Li ion-containing recovery liquid $B_2$) in which Li ions have been recovered in the Li ion recovery tank heat exchangers 13*a*, 13*b* and 13*c*, and a drying device 14, and the Li ion recovery tank 10 is equipped with a raw liquid tank 10*a* for storing a raw liquid A, a recovery liquid tank 10*b* for storing a recovery liquid $B_1$, and a Li permselective membrane 10*c*. The Li permselective membrane 10*c* is equipped with a first electrode 10*d* (anode) on one principal plane side (on the side of the raw liquid A), and a second electrode 10*e* (cathode) on the other principal plane side (on the side of the recovery liquid $B_1$), and the recovery liquid storage tank 11 is equipped with a temperature control device 11*a* capable of controlling the recovery liquid at 50° C. or higher.

Also the lithium hydroxide production apparatus shown in FIG. 2 has, like the production apparatus shown in FIG. 1, a Li ion recovery tank 10, a storage tank 11 for storing a recovery liquid, a crystallization device 12 for crystallizing the recovery liquid, which is a separation device for separating lithium hydroxide from the Li ion-containing recovery liquid $B_2$, heat exchangers 13*a*, 13*b* and 13*c*, and a drying device 14, and the Li ion recovery tank 10 is equipped with a raw liquid tank 10*a* for storing a raw liquid A, a recovery liquid tank 10*b* for storing a recovery liquid $B_1$, and a Li permselective membrane 10*c*. The Li permselective membrane is equipped with a first electrode 10*d* (anode) on one principal plane side (on the side of the raw liquid A), and a second electrode 10*e* (cathode) on the other principal plane side (on the side of the recovery liquid $B_1$), and the recovery liquid storage tank 11 is equipped with a temperature control device 11*a* capable of controlling the recovery liquid at 50° C. or higher. There is a difference in the point that a recovery line for the filtrate C discharged from the crystallization device 12 to be the separation device is provided. In the Li ion recovery tank 10 in FIG. 1 and FIG. 2, oxygen and hydrogen can be formed in the raw liquid tank 10*a* and the recovery liquid tank 10*b*, respectively, by electrolysis of water, and therefore, preferably, the tank in these is equipped with piping or the like for discharging or recovering the gases.

In the Li ion recovery tank 10, Li ions contained in the raw liquid A are moved from the raw liquid A to the recovery liquid $B_1$ using the Li permselective membrane 10*c*, recovered in the recovery liquid $B_1$, and the recovery liquid $B_1$ is, after passing through the recovery liquid storage tank 11, then supplied to the crystallization device 12 as a Li ion-containing recovery liquid $B_2$.

The production apparatus of FIG. 1 and FIG. 2 is equipped with a heat exchanger 13*a* for heating the Li ion-containing recovery liquid $B_2$ to a predetermined temperature. As the heat exchanger 13*a*, a shell/tube type heat exchanger using a medium as shown in FIG. 1 is employable, and in addition thereto, also employable is a heat exchanger such as jacket type or heater type to run with electricity, a heat medium or the like. As the heat source, the exhaust heat in cooling crystallization or the surplus heat or the like generated in evaporative crystallization can also be used. The same applied to the heat exchangers 13*b* and 13*c* to be mentioned below.

In the production apparatus of FIG. 1, lithium hydroxide crystallized in the crystallization device 12 of a separation device, and the filtrate formed by crystallization are separated from each other by solid-liquid separation or the like, and lithium hydroxide is further dried in the drying device 14, and lithium hydroxide monohydrate ($LiOH \cdot H_2O$) is extracted out as a product.

The filtrate C is optionally heated in the heat exchanger 13*b* along with pure water that is to be additionally supplied, as needed, and then via the recovery liquid storage tank 11 and after optionally heated in the heat exchanger 13*c*, supplied to the recover tank 10*b* of the Li ion recovery tank 10, as a recovery liquid $B_0$ not substantially containing Li ions. The recovery liquid $B_0$ not substantially containing Li ions means that, when not containing the filtrate C, the recovery liquid $B_0$ is water such as pure water, that is, the recovery liquid $B_0$ of the case does not contain water at all, and when the recovery liquid $B_0$ contains the filtrate C, the filtrate C in the case may contain Li ions but this is one resulting from removal of Li ions by crystallization of lithium hydroxide from the recovery liquid $B_1$ stored in the recovery liquid tank 10*b* and the Li ion-containing recovery liquid $B_2$ supplied to the crystallization device 12, and consequently, the content of Li ions in the recovery liquid $B_0$ in the case is smaller than that in the recovery liquids $B_1$ and $B_2$.

The production apparatus of the present embodiment preferably has a filtrate recovery device 15 for adding the filtrate formed in the crystallization device to the recovery liquid, as described above. The production apparatus shown in FIGS. 1 and 2 has the filtrate recovery device 15, and specifically, this corresponds to the line from the crystallization device 12 that is a separation device, to the recovery liquid storage tank 11, via which the filtrate C formed in crystallization in the crystallization device 12 is added to the recovery liquid. The filtrate recovery device 15 can be provided with the heat exchanger 13 *b* corresponding to a temperature control device, and a line for supplying pure water to the recovery liquid, as shown in FIGS. 1 and 2. Though not shown in FIGS. 1 and 2, the filtrate recovery device 15 can be provided with a pump for pumping the filtrate, as needed, and gauges such as a flow meter.

In the production apparatus of FIG. 2, evaporative crystallization is employed and in this, therefore, vapor is discharged out from the crystallization device 12 by depressurization or the like and cooled distilled water is recovered as the filtrate C and in addition, in this, crystallized lithium hydroxide and a liquid filtrate are formed, like in the production apparatus of FIG. 1, and accordingly the liquid filtrate is also recovered as the filtrate C. In that manner, the filtrate recovery device 15 can be provided with a line for supplying the cooled distilled water to the recovery liquid, in addition to the line for supplying pure water to the recovery liquid as shown in FIG. 1.

The Li ion recovery tank 10 can be in the form of one tank where the raw liquid tank 10*a* and the recovery liquid tank 10*b* are separated via the Li permselective membrane 10*c*, or can be in a connected form where two tanks of the raw liquid tank 10*a* and the recovery liquid tank 10*b* are connected via the Li permselective membrane 10*c*.

In the production apparatus of FIG. 1, the temperature is controlled at 50° C., and this is the temperature of the recovery liquid in the recovery liquid tank 10*b*. For controlling the recovery liquid $B_1$ in the recovery liquid tank 10*b* at 50° C., at least one of the heat exchangers 13*b* and 13*c* can be used before the recovery liquid $B_0$ is supplied to the recovery liquid tank 10*b*, or the temperature control device 11*a* arranged in the recovery liquid storage tank 11 can be used. For example, in the case where the production apparatus does not have the temperature control device 11*a*, the recovery liquid $B_0$ is heated so that the temperature thereof at the outlet of at least one of the heat exchangers 13*b* and 13*c* can be higher than 50° C., and the temperature of the recovery liquid in the recovery liquid tank 10*b* may thereby be controlled at 50° C. In the case where the apparatus has the temperature control device 11*a* and uses it, the temperature of the recovery liquid $B_0$ at the outlet of the heat exchanger 13*b* may not be up to 50° C. A temperature control device corresponding to the temperature control device 11*a* in the recovery liquid storage tank 11 can be arranged in the recovery liquid tank 10*b*.

From the viewpoint of more surely and stably controlling the recovery liquid at 50° C., preferably, the temperature control device 11*a* is arranged along with the heat exchanger 13*b*, as shown in FIG. 1.

The heat exchanger 13*c* is advantageous to be provided in the case of batchwise operation where the recovery liquid is circulated between the recovery liquid tank 10*b* and the recovery liquid storage tank 11, for example until the concentration of Li ions contained in the recovery liquid B1 can increase up to a predetermined level, in addition to heating the recovery liquid $B_0$, and where the temperature of the recovery liquid in the recovery liquid tank 10*b* is controlled at 50° C.

As described above, the temperature of the raw liquid can also be controlled, and the production apparatus can have a temperature control device corresponding to it (not shown). In that case, like those for the recovery liquid, a raw liquid storage tank and a heat exchanger are provided for the raw liquid, and the raw liquid can be heated with the heat exchanger while kept circulated between the raw liquid tank 10*a* and the storage tank. Also a heat exchanger can be arranged in the raw liquid storage tank, or a heat exchanger can be arranged in the raw liquid tank 10*a*.

Along the filtrate line from the crystallization device 12 to the recovery liquid storage tank 11, or along the line for supply to the filtrate, such as the line of supply of pure water and distilled water thereto, a thermal insulation device can be arranged, or a heat exchanger such as jacket-type or heater-type to run with electricity, a heat medium or the like can also be arranged therearound for thermal insulation.

Preferably, the production apparatus is provided with the recovery liquid storage tank 11.

Provided with the recovery liquid storage tank 11, the apparatus can readily run in a batchwise operation mode of circulating the recovery liquid between the recovery liquid tank 10*b* and the recovery liquid storage tank 11 until the concentration of Li ions contained in the recovery liquid $B_1$ as mentioned above can increase up to a predetermined level, and in addition, the apparatus is applicable to various operation modes, for example, the recovery liquid can be circulated and heated at the rising of the production apparatus, or the filtrate is once stored in supplying to the recovery liquid tank as a recovery liquid. By combination of the heat exchanger 13*c* and the temperature control device 11*a*, the above-mentioned batchwise operation, and also the other mode of heating the recovery liquid in circulation at the rising of the production apparatus can be readily performed, and hence the recovery liquid can be more surely and more stably controlled at 50° C.

With no specific limitation, the temperature control device 11*a* can be any device capable of controlling the temperature of the recover liquid, and can be, for example, a heat exchanger, or any other type capable of entirely heating the recovery liquid storage tank 11, such as an air conditioner. In the case of employing a heat exchanger, the type thereof is not specifically limited, and can be appropriately selected depending on the use mode thereof. Like the above-mentioned heat exchangers 13*a* to 13*c*, for example, a shell/tube type heat exchanger using a medium, and heat exchangers such as jacket-type or heater-type to run with electricity, a heat medium or the like are employable. As the heat source for heating, the exhaust heat in cooling crystallization or the surplus heat or the like generated in evaporative crystallization can be used.

The crystallization device 12 is a device arranged for crystallizing lithium hydroxide from the recovery liquid which Li ions have been recovered in the Li ion recovery tank 10 (Li ion-containing recovery liquid). In batchwise operation where the recovery liquid is circulated between the recovery liquid tank 10*b* and the recovery liquid storage tank 11, for example, until the concentration of Li ions contained in the recovery liquid $B_1$ as mentioned above can increase up to a predetermined level, after the concentration has reached a predetermined level, crystallization can be performed in a manner that a part or all of the recovery liquid $B_1$ is discharged out as the Li ion-containing recovery liquid $B_2$ and fed to the crystallization device 12.

In the crystallization device 12, as mentioned above, cooling crystallization or evaporative crystallization or the like is employed for crystallization, and therefore in this, a device suitable for the crystallization mode is employable, and commercially-available crystallization devices can be used.

A seed crystal of a lithium hydroxide compound can be added for accelerating solid precipitation in crystallization, and the crystallization device 12 can be provided with a device of adding a seed crystal thereto. As needed, the crystallization device 12 can be optionally provided with a device for separating crystallized lithium hydroxide from the filtrate, such as a solid-liquid separation device.

In the case where cooling crystallization is employed as crystallization, an inert gas supply line for maintaining a positive pressure by supply and discharge of an inert gas, and a pressure control valve and an exhaust line for evacuation in accordance with the pressure in the crystallization device 12 can be arranged, like in the production apparatus of FIG. 1.

Also in the case where evaporative crystallization is employed as crystallization, a depressurization device for discharging the filtrate formed in the crystallization device, as water vapor can be arranged, like in the production apparatus of FIG. 2, or a cooling device for cooling the filtrate that has been discharged as water vapor to be a liquid filtrate, that is, distilled water, can be arranged.

The drying device 14 is a device in which, after lithium hydroxide crystallized in the crystallization device 12 has been separated from the filtrate by solid-liquid separation and the like, lithium hydroxide still containing water that has not been separated as yet is dried to give lithium hydroxide monohydrate ($LiOH \cdot H_2O$) or lithium hydroxide anhydride.

The drier for use in the drying device 14 can be appropriately selected in accordance with the desired drying degree and scale, and examples thereof usable here include a heating device such as a hot plate, a horizontal drier having a heating device and a feed mechanism, or a horizontal vibration fluid drier, or others that are commercially available as a Henschel mixer or an FM mixer capable of drying with stirring under heat at 50 to 140° C. or so generally in a reduced pressure atmosphere at 1 to 80 kPa or so.

[Production Method for Lithium Sulfide]

The lithium hydroxide production method of the present embodiment is applicable to a lithium sulfide production method to be mentioned below, that is, a production method for lithium sulfide that includes supplying hydrogen sulfide to the recovery liquid in the lithium hydroxide production method of the present embodiment mentioned above, or supplying hydrogen sulfide to lithium hydroxide obtained in the lithium hydroxide production method mentioned above.

The method for supplying hydrogen sulfide is not specifically limited. In the case of supplying hydrogen sulfide to the recovery liquid, a hydrogen sulfide gas can be blown into the recovery liquid, and in the case, lithium sulfide and water are formed by reaction of lithium hydroxide and hydrogen sulfide. The formed water is appropriately removed, and finally after water has been substantially removed, introduction of hydrogen sulfide blown into the system is stopped to give lithium sulfide.

In the case of supplying hydrogen sulfide to the recovery liquid, a hydrogen sulfide gas can be supplied to the crystallization device of the lithium hydroxide production apparatus mentioned above, that is, a hydrogen sulfide gas can be blown into the Li ion-containing recovery liquid to be reacted therewith, or the Li ion-containing recovery liquid can be supplied to a different reactor, and a hydrogen sulfide gas can be blown into the reactor in any mode of a closed system (batch mode system) or a flow system.

In the case where hydrogen sulfide is supplied to lithium hydroxide, for example, lithium hydroxide and a hydrogen sulfide gas can be put into a reactor and can be reacted therein with stirring to give lithium sulfide. In that case, lithium hydroxide can be a hydrate or an anhydride, but in consideration of efficiency, it is preferable that lithium hydroxide is reacted with hydrogen sulfide as a hydrate thereof.

The reaction temperature between lithium hydroxide and hydrogen sulfide can be generally 120° C. or higher and 300° C. or lower, preferably 140° C. or higher and 230° C.

or lower, more preferably 150° C. or higher and 220° C. or lower, even more preferably 160° C. or higher and 210° C. or lower. When the reaction temperature falls within the range, the reaction is promoted, and high-purity lithium sulfide in which the remaining amount of lithium hydroxide is reduced can be readily obtained.

The reaction time is preferably 1 hour or more and 60 hours or less, preferably 2 hours or more and 30 hours or less, and preferably 6 hours or more and 20 hours or less. In the present description, the reaction time means a time for which hydrogen sulfide is brought into contact and reacted with lithium hydroxide, more specifically, a time from the start of supply of hydrogen sulfide to the end of supply thereof.

Lithium sulfide produced in the manner as above can be optionally purified, as needed. The purification method is not specifically limited, and can be an ordinary method.

EXAMPLES

Next, the present invention is described specifically with reference to Examples, but the present invention is not whatsoever restricted by these Examples.

(Lithium Hydroxide Production Apparatus)

An apparatus having a Li ion recovery tank where a raw liquid tank and a recovery liquid tank are separated via a Li permselective membrane, and having a recovery liquid storage tank, a crystallization device capable of cooling crystallization as a separation device, and a heat exchanger (heat exchanger 13*b*) as a temperature control device, were used in the order of the production apparatus shown in FIG. 2 was used here.

As the crystallization device to be a separation device, used was a device equipped with a separable flask having a mixing impeller and a thermometer, in a thermostat chamber. The separable flask has a nitrogen supply device for controlling supply and evacuation of nitrogen gas (inert gas) for attaining crystallization under positive pressure. The crystallization device has a device in which a flask equipped with a filtration part equipped with filter paper and a connecting part to an aspirator at the top thereof is set in a glove bag (of which the inside can be substituted with nitrogen, as needed), as a solid-liquid separation device.

(Production of Li Permselective Membrane)

A Li permselective membrane produced as follows was used.

A lithium permselective membrane body formed of a constitutive material, lithium lanthanum titanate ($Li_{0.29}La_{0.57}TiO_3$) as produced, and one principal plane of the body was exposed to hydrochloric acid at 60° C. for 5 days to obtain a lithium permselective membrane having a lithium adsorbent layer (HLTO) formed on one principal plane of the lithium permselective membrane body (LLTO).

(Measurement of Yield and Purity of Lithium Hydroxide)

The solid (also referred to as "cake") obtained by filtration through the solid-liquid separation device of the lithium hydroxide production apparatus was transferred onto a laboratory dish, and dried in a vacuum drier (corresponding to "drying device") at 40° C. for 2 hours to obtain a dry cake. The dry cake was weighed, and this is the yield of lithium hydroxide monohydrate in Examples and Comparative Examples, and the purity thereof was measured by neutralization analysis.

Example 1

As a lithium ion extract extracted from a processed member of a lithium secondary battery, 2 L of an aqueous 3.0 M lithium hydroxide solution (pH 14.6) (content of lithium hydroxide: 126 g, (as lithium hydroxide monohydrate)) was used simulatively. The extract was put into the raw liquid tank of the production apparatus, and 200 mL of an aqueous solution of 3.0 M lithium hydroxide was put into the recovery liquid tank, and nitrogen was supplied to the recovery liquid tank. Next, while the temperature of the recovery liquid in the recovery liquid tank was kept controlled at 80° C. using an electric heater, a voltage of 5 V was applied to both surfaces of the Li permselective membrane so that Li ions were recovered in the recovery liquid.

After voltage application for 20 hours, Li ions were recovered, and a part of the recovery liquid (corresponding to 7.5 mL) was, while kept away from air, transferred into the separable flask in the crystallization device. While nitrogen was kept supplied into the separable flask, the recovery liquid in the separable flask was kept at 25° C. by setting the temperature of the thermostat tank at 25° C., and hence cooling crystallization was performed at the crystallization temperature of 25° C. The lithium hydroxide concentration in the recovery liquid was 6.0 M as lithium hydroxide monohydrate.

Next, the liquid containing lithium hydroxide precipitated by the cooling crystallization in the separable flask was, in a glove bag filled with nitrogen so as to be kept away from air, transferred into the filtration part equipped with filter paper in the solid-liquid separation device set therein, and filtered under reduced pressure by aspiration to obtain lithium hydroxide monohydrate. The yield of the resultant lithium hydroxide monohydrate was measured according to the above-mentioned method, and was 1.89 g. The purity thereof was 99.7%.

In Example 1, crystallization (crystallization in the separable flask and filtration in the solid-liquid separation device) was performed in the presence of an inert gas, and in this, lithium hydroxide was produced in an "inert" atmosphere as a crystallization environment. Also in the other Examples and Comparative Examples where the atmosphere was "inert", the operation means that crystallization was performed in the presence of an inert gas.

Example 2

In Example 1, a part (corresponding to 7.5 mL) of the recovery liquid in which Li ions were recovered after voltage application for 20 hours was subjected to cooling crystallization in the same manner as in Example 1, and the entire amount of the part thereof was filtered using the solid-liquid separation device. Then, pure water was added to the resultant filtrate, and the total liquid (7.5 mL) was returned back to the recovery liquid storage tank. While the temperature of the recovery liquid in the recovery liquid tank was controlled at 80° C. with an electric heater, a voltage of 5 V was applied thereto for 1.5 hours. A part (corresponding to 7.5 mL) of the recovery liquid in which Li ions were recovered was subjected to cooling crystallization in the same manner as in Example 1, then filtered through the solid-liquid separation device to obtain lithium hydroxide. The yield of the resultant lithium hydroxide was 1.92 g, and the purity thereof was 99.6%.

Comparative Example 1

Lithium hydroxide was obtained in the same manner as in Example 1, except that, in Example 1, the temperature of the recovery liquid was not 80° C. but Comparative Example 2

Lithium hydroxide was obtained in the same manner as in Example 1, except that, in Example 1, the temperature of the recovery liquid was not 80° C. but and that the operation of crystallization was performed in air with no supply of nitrogen to the separable flask in the crystallization device.

TABLE 1

| | | Example | | Comparative Example | |
|---|---|---|---|---|---|
| | | 1 | 2 | 1 | 2 |
| Recovery Liquid Temperature | ° C. | 80 | 80 | 45 | 45 |
| Crystallization Temperature | ° C. | 25 | 25 | 25 | 25 |
| Crystallization Environment | — | inert | inert | inert | air |
| Recovery of Filtrate into Recovery Liquid | — | no | yes | no | no |
| Yield of Lithium Hydroxide Monohydrate | g | 1.89 | 1.92 | 0.63 | 0.63 |
| Purity of Lithium Hydroxide Monohydrate | % | 99.7 | 99.6 | 97.8 | 91.0 |

The results of Examples confirm that, according to the lithium hydroxide production method of the present embodiment, since it does not require a dewatering step of heating concentration or the like, lithium hydroxide can be produced at a lower energy. In addition, it is also confirmed that high-purity lithium hydroxide can be produced at a higher yield.

On the other hand, it is confirmed that, in Comparative Examples 1 and 2 where the recovery liquid temperature was 45° C., the yield was extremely small. In addition, in Comparative Example 2 where the crystallization environment was air, the purity lowered, and therefore, it is also confirmed that, for obtaining lithium hydroxide having a higher purity, the crystallization environment is preferably inert.

REFERENCE SIGNS LIST

10. Li Ion Recovery Tank
10*a*. Raw Liquid Tank
10*b*. Recovery Liquid Tank
10*c*. Li Permselective Membrane
10*d*. First Electrode
10*e*. Second Electrode
11. Recovery Liquid Storage Tank
11*a*. Temperature Control Device
12. Crystallization Device
13*a*. Heat Exchanger
13*b*. Heat Exchanger
13*c*. Heat Exchanger
14. Drying Device
15. Filtrate Recovery Device
A: Raw Liquid
$B_0$: Recovery Liquid
$B_1$: Recovery Liquid (in recovery liquid tank)
$B_2$: Li Ion-Containing Recovery Liquid
C: Filtrate

The invention claimed is:

1. A method for producing lithium hydroxide, comprising recovering Li ions alone in a recovery liquid from a lithium ion extract extracted from a processed member of a lithium secondary battery, using a Li permselective membrane, and producing lithium hydroxide from the recovery liquid, wherein:

the Li ions are recovered while a temperature of the recovery liquid is controlled at 50° C. or higher, lithium hydroxide is separated from the recovery liquid by cooling crystallization, and the cooling crystallization is performed with maintaining a positive pressure by blowing an inert gas into the recovery liquid for the crystallization.

2. The lithium hydroxide production method according to claim 1, wherein the temperature is 80° C. or higher and 100° C. or lower.

3. The lithium hydroxide production method according to claim 1, wherein the cooling crystallization is performed while the temperature of the recovery liquid for the crystallization is controlled at 40° C. or lower.

4. The lithium hydroxide production method according to claim 1, including adding the filtrate formed in the crystallization to the recovery liquid.

5. The lithium hydroxide production method according to claim 4, wherein the filtrate is heated.

6. The lithium hydroxide production method according to claim 4, wherein impurities are not removed in adding the filtrate to the recovery liquid.

7. The lithium hydroxide production method according to claim 1, wherein the Li permselective membrane contains a Li-containing oxide or oxynitride.

* * * * *